US010789418B2

(12) United States Patent
Kutilek et al.

(10) Patent No.: US 10,789,418 B2
(45) Date of Patent: Sep. 29, 2020

(54) BATCH GENERATION OF LINKS TO DOCUMENTS BASED ON DOCUMENT NAME AND PAGE CONTENT MATCHING

(71) Applicant: Bluebeam, Inc., Pasadena, CA (US)

(72) Inventors: Jack Kutilek, Pasadena, CA (US); Peter Noyes, Sunland, CA (US)

(73) Assignee: Bluebeam, Inc., Pasadena, CA (US)

( * ) Notice: Subject to any disclaimer, the term of this patent is extended or adjusted under 35 U.S.C. 154(b) by 221 days.

(21) Appl. No.: 15/967,101

(22) Filed: Apr. 30, 2018

(65) Prior Publication Data

US 2018/0246858 A1 Aug. 30, 2018

Related U.S. Application Data

(63) Continuation of application No. 14/171,475, filed on Feb. 3, 2014, now Pat. No. 9,990,340.

(51) Int. Cl.
*G06F 40/134* (2020.01)
*G06F 3/0482* (2013.01)
(Continued)

(52) U.S. Cl.
CPC .......... *G06F 40/134* (2020.01); *G06F 3/0482* (2013.01); *G06F 16/94* (2019.01);
(Continued)

(58) Field of Classification Search
CPC .......... G06F 17/2235; G06F 17/30864; G06F 17/30011; G06F 17/30882; G06F 17/30905; G06F 17/30867; G06F 17/3089
See application file for complete search history.

(56) References Cited

U.S. PATENT DOCUMENTS 5,544,360 A 8/1996 Lewak et al.
5,694,594 A * 12/1997 Chang ................... G06F 16/748
(Continued)

FOREIGN PATENT DOCUMENTS

EP 2092487 B1 3/2011
EP 2328101 A1 6/2011
(Continued)

OTHER PUBLICATIONS

Kim et al: "Automatic In-Text Keyword Tagging based on Information Retrieval", Journal of Information Processing Systems, vol. 5, No. 3, Sep. 30, 2009, pp. 159-166.
(Continued)

*Primary Examiner* — Quoc A Tran
(74) *Attorney, Agent, or Firm* — Bookoff McAndrews, PLLC

(57) ABSTRACT

Batch generating of links to documents in which named content is automatically discovered within documents is disclosed. A selection of a plurality of documents is received from a user. Then, a list of search terms each correlated to a hyperlink destination is generated from the received selection of the electronic documents. Each of the plurality of electronic documents is scanned for text strings that match search terms stored in a list. Without user intervention, activatable hyperlinks from the matched text strings in the plurality of electronic documents are generated. Activatable hyperlinks to the respective matched text strings in each of the plurality of electronic documents are appended.

18 Claims, 8 Drawing Sheets

(51) Int. Cl.
*G06F 16/93* (2019.01)
*G06F 40/169* (2020.01)
*G06Q 10/10* (2012.01)
*G03G 15/00* (2006.01)
*G06F 16/951* (2019.01)
*G06F 16/958* (2019.01)
*G06F 16/9535* (2019.01)
*G06F 16/955* (2019.01)
*G06F 16/957* (2019.01)
*G06F 40/14* (2020.01)
*G06F 40/174* (2020.01)
*G06F 40/226* (2020.01)
*G06F 17/00* (2019.01)

(52) U.S. Cl.
CPC ....... *G06F 40/169* (2020.01); *G03G 15/5016* (2013.01); *G06F 16/93* (2019.01); *G06F 16/951* (2019.01); *G06F 16/958* (2019.01); *G06F 16/9535* (2019.01); *G06F 16/9558* (2019.01); *G06F 16/9577* (2019.01); *G06F 40/14* (2020.01); *G06F 40/174* (2020.01); *G06F 40/226* (2020.01); *G06Q 10/10* (2013.01)

(56) References Cited

U.S. PATENT DOCUMENTS

| | | |
|---|---|---|
| 5,708,825 A | 1/1998 | Sotomayor |
| 2001/0049698 A1 | 12/2001 | Hsu et al. |
| 2002/0107882 A1 | 8/2002 | Gorelick et al. |
| 2004/0004636 A1 | 1/2004 | Driel |
| 2006/0195461 A1 | 8/2006 | Lo et al. |
| 2007/0192708 A1 | 8/2007 | Lee et al. |
| 2007/0300176 A1* | 12/2007 | Fischer ............... G06F 40/174 715/780 |
| 2008/0114789 A1 | 5/2008 | Wysham |
| 2008/0263022 A1* | 10/2008 | Kostorizos ............ G06F 16/954 |
| 2009/0171907 A1 | 7/2009 | Radovanovic |
| 2012/0030368 A1* | 2/2012 | John ................ H04N 21/23109 709/231 |
| 2012/0290448 A1 | 11/2012 | England et al. |

FOREIGN PATENT DOCUMENTS

| | | |
|---|---|---|
| EP | 1474759 B1 | 10/2011 |
| JP | 2000268029 A | 9/2000 |
| WO | 2003060767 A2 | 7/2003 |
| WO | 2004107223 A1 | 12/2004 |

OTHER PUBLICATIONS

"Hierarchical File System" Wikipedia, Nov. 5, 2013, 5 pages, https://en.wikipedia.org/wiki/Hierarchical_File_System, [retrieved Aug. 29, 2017].

Extended European Search Report in European Application No. 15742769.1 dated Sep. 6, 2017.

PCT International Search Report and Written Opinion for International Application No. PCT/US15/13142 dated May 20, 2015.

* cited by examiner

BATCH GENERATION OF LINKS TO DOCUMENTS BASED ON DOCUMENT NAME AND PAGE CONTENT MATCHING

CROSS-REFERENCE TO RELATED APPLICATIONS

This application claims the benefit of priority from U.S. Nonprovisional application Ser. No. 14/171,475, filed on Feb. 3, 2014, which is incorporated by reference herein in its entirety.

STATEMENT RE: FEDERALLY SPONSORED RESEARCH/DEVELOPMENT

Not Applicable

BACKGROUND

1. Technical Field

The present disclosure relates generally to electronic document management, and more particularly, to batch generating links to documents automatically without user intervention based on document name and page content matching.

2. Related Art

The creation, distribution, and management of information are core functions of business. Information or content can be presented in a variety of different ways, including word processing documents, spreadsheets, graphics, photographs, engineering drawings, architectural plans, and so forth. In electronic form, these are generally referred to as documents, and may be generated and manipulated by computer software applications that are specific thereto. The workflows of creating, reviewing, and/or editing electronic documents have evolved to accommodate the specific requirements of various fields, though the need for a device-independent, resolution-independent file format led to the widespread adoption of the Portable Document Format (PDF), amongst other competing formats. Accordingly, different platforms having a wide variety of operating systems, application programs, and processing and graphic display capabilities can be accommodated regardless of the particulars of the workflow.

The PDF standard is a combination of a number of technologies, including a simplified PostScript interpreter subsystem, a font embedding subsystem, and a storage subsystem. As those having skill in the art will recognize, PostScript is a page description language for generating the layout and the graphics of a document. Further, per the requirements of the PDF storage subsystem, all elements of the document, including text, vector graphics, and raster (bitmap) graphics, collectively referred to herein as graphic elements, are encapsulated into a single file. The graphic elements are not encoded to a specific operating system, software application, or hardware, but are designed to be rendered in the same manner regardless of the specificities relating to the system writing or reading such data. The cross-platform capability of PDF aided in its widespread adoption, and is now a de facto document exchange standard. Although originally proprietary, PDF has been released as an open standard published by the International Organization for Standardization (ISO) as ISO/IEC 3200-1:2008. Currently, PDF is utilized to encode a wide variety of document types, including those composed largely of text, and those composed largely of vector and raster graphics. Because of its versatility and universality, files in the PDF format are often preferred over more particularized file formats of specific applications.

In technical fields such as engineering and architecture, one project typically involves multiple aspects with numerous professionals spanning a wide range of disciplines. The planning documents, e.g., drawings, are specific to each discipline. For example, in a building construction project, there may be one set of plans for the structural aspect, while there may be another set of plans for the heating/ventilation/air conditioning (HVAC) aspect, and another set of plans for plumbing, another set for electrical, etc. A high level of detail is necessary in the planning documents to accurately convey the specifications of the project so that it can be correctly implemented. Although the ability to zoom in and zoom out of an electronic document alleviates this issue to a certain degree, the size and the amount of information contained in any one page must nevertheless remain manageable while retaining all the necessary detail so that viewing, editing, and annotating do not require complicated inputs/interface manipulations.

In many cases, it is adequate to have the entirety of the planning document stored in a single document, though separated into multiple pages. That single document may be stored as a single file on a hierarchical file system that is organized according to directories and subdirectories. Sharing amongst participating personnel, as well as updating and maintaining the single file are thus greatly simplified. This storage arrangement may be suitable when the document is of minimal length and size. Opening larger file sizes tend to be more time consuming, and any sort of manipulation and committing of the changes more heavily taxes the computer system. Furthermore, e-mail servers typically limit the size of the attachments that can be sent and received, so auxiliary file sharing services are needed. Although there are collaboration systems that allow for concurrent changes to be made to a file, with a conventional file system, a given file is locked for editing by a single user at a time. If the document is being heavily edited and reviewed, the lack of simultaneous access is problematic.

Thus, for complex documents, discrete sections thereof may be separated into separate files. Keeping such separate files organized can be challenging, as the file naming convention dictated by the hierarchical file system is oftentimes the sole modality by which any particular document can be identified in a vast repository of files. Furthermore, with most engineering and architectural planning documents, there are extensive cross-references from one section to another, and where there are multiple files in a set of documents, extensive cross-references from one file to another. Creating and managing such cross references so that a document or a section of a document can be immediately accessed upon command is a time-consuming manual procedure that requires not only the ability to perform the technical aspects of this task, but an understanding of the subject matter so that meaningful cross-references can be created.

Accordingly, there is a need in the art for an automatic batch generation of links to documents without user intervention based on document name and page content matching.

BRIEF SUMMARY

The present disclosure contemplates a batch generation of links to documents in which named content is automatically discovered within documents, and hyperlinks that point to the named content are placed for instances of each discovered textual reference thereto in a set of documents. The method for hyperlinking the plurality of electronic documents may include a step of receiving a selection thereof. The method may also include generating a list of search terms that may each be correlated to a hyperlink destination. This list may be generated from the received selection of the plurality of documents. Then, the method may proceed to scanning each of the plurality of electronic documents of the selection for text strings matching the search terms in a list. Then, the method may continue with generating, without user intervention, activatable hyperlinks from the matched text strings in the plurality of electronic documents. The activatable hyperlinks may be assigned the hyperlink destinations to which the corresponding search terms of the matched text strings are correlated in the list. Thereafter, the method may include appending the activatable hyperlinks to the respective matched text strings in each of the plurality of electronic documents.

Certain other embodiments of the present disclosure contemplate respective computer-readable program storage media that each tangibly embodies one or more programs of instructions executable by a data processing device to perform the foregoing method. The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of the presently preferred embodiment methods for generating unique document page identifiers from content within a selected page region. It is not intended to represent the only form in which the present method may be developed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first, second, and the like are used solely to distinguish one from another entity without necessarily requiring or implying any actual such relationship or order between such entities.

Figure 1:
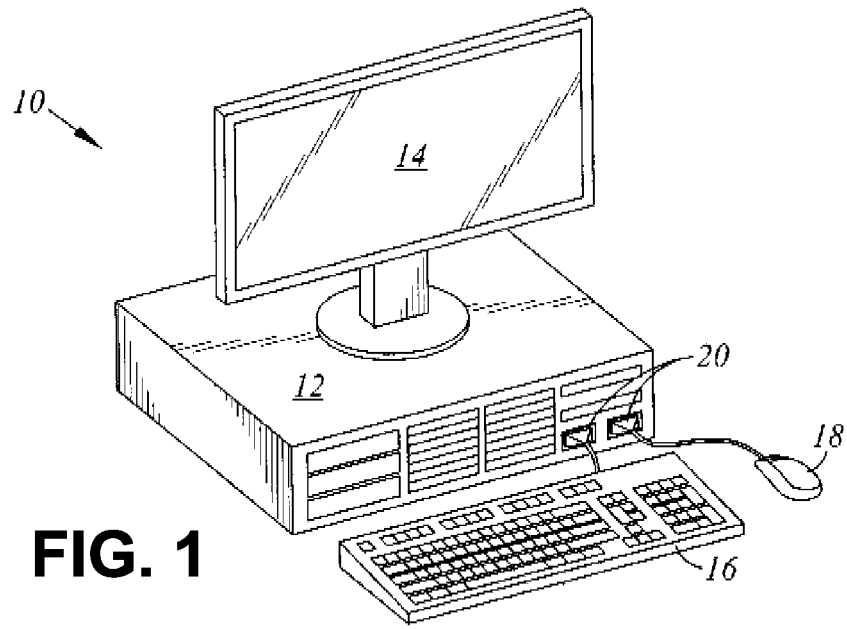
FIG. 1 is an exemplary computer system that may be capable to perform functions for use with aspects of the present invention including a display monitor.

FIG. 1 depicts an exemplary hardware environment in which various aspects of the contemplated method of document management and arrangement may be implemented. Generally, there is a computer system 10 with a system unit 12 and a display device 14. The display device 14 produced a graphical output from the data processing operations performed by the system unit 12. Input devices including a keyboard 16 and a mouse 18, for example, may be manipulated by a user to generate corresponding inputs to the data processing operations, and are connected to the system unit 12 via ports 20. Various other input and output devices may be connected to the system unit 12, and different interconnection modalities are known in the art.

Figure 2:
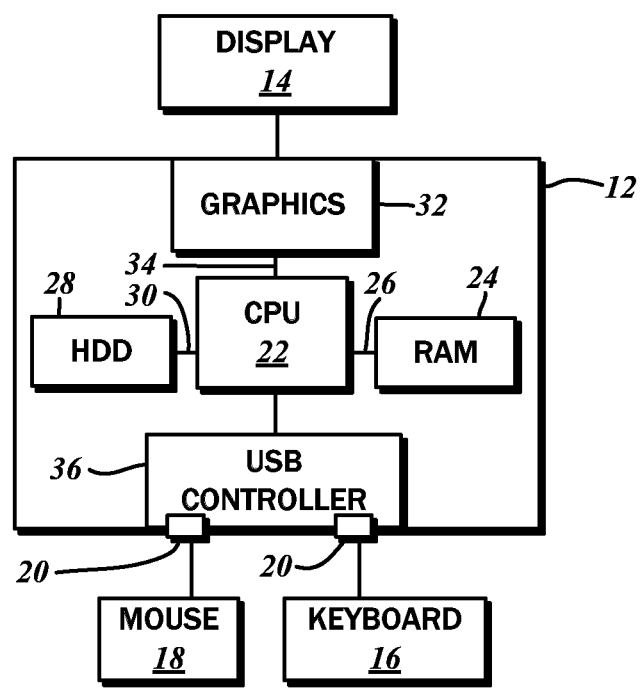
FIG. 2 is a block diagram of system components of the exemplary computer system of FIG. 1.

As shown in the block diagram of FIG. 2, the system unit 12 includes a processor (CPU) 22, which may be any conventional type. A system memory (RAM) 24 temporarily stores results of the data processing operations performed by the CPU 22, and is interconnected thereto typically via a dedicated memory channel 26. The system unit 12 may also include permanent storage devices such as a hard drive 28, which is also in communication with the CPU 22 over an input/output (I/O) bus 30. A dedicated graphics module 32 may also be connected to the CPU 22 via a video bus 34, and transmit signals representative of display data to the display device 14. As indicated above, the keyboard 16 and the mouse 18 are connected to the system unit 12 over the port 20. In the embodiments where the port 20 is a USB type, there may be a USB controller 36 that translates data and instructions to and from the CPU 22 for the external peripherals connected via the port 20. Additional devices such as printers, microphones, speakers, and the like may be connected to the system unit 12 thereby.

The system unit 12 may utilize any operating system having a graphical user interface (GUI), such as WINDOWS from Microsoft Corporation of Redmond, Wash., MAC OS from Apple, Inc. of Cupertino, Calif., various versions of UNIX with the X-Windows windowing system, and so forth. The system unit 12 executes one or more computer programs, with the results thereof being displayed on the display device 14. Generally, the operating system and the computer programs are tangibly embodied in a computer-readable medium, e.g., the hard drive 28. Both the operating system and the computer programs may be loaded from the aforementioned data storage devices into the RAM 24 for execution by the CPU 22. The computer programs may comprise instructions, which, when read and executed by the CPU 22, cause the same to perform or execute the steps or features of the various embodiments set forth in the present disclosure.

According to one embodiment, a user can interact with the computer system 10, and specifically with the graphics being generated on the display device 14, via the mouse 18. The movement of a cursor generated on the display device 14 is tied to the movement of the mouse 18, with further interactivity being provided with input from the mouse buttons. Input from the keyboard 16 also provides interactivity with the computer system 10.

Although certain features of the present disclosure are described in relation to a computer system with such input and output capabilities, specifics thereof are presented by way of example only and not of limitation. Any alternative graphical user interfaces such as touch interfaces and pen/digitizer interfaces may be substituted. The analogs of those features will be readily appreciated, along with suitable modifications to accommodate these alternative interfaces while still achieving the same functionalities.

Along these lines, the foregoing computer system 10 represents only one exemplary apparatus of many otherwise suitable for implementing aspects of the present disclosure, and only the most basic of the components thereof have been described. It is to be understood that the computer system 10 may include additional components not described herein, and may have different configurations and architectures. Any such alternative is deemed to be within the scope of the present disclosure.

Various embodiments of the present disclosure contemplate a method to automatically discover named content and place hyperlinks pointing to the named content over instances of each in a set of documents. This method may be implemented as a series of executable instructions that are part of a document management software application. As utilized herein, the term document refers to standalone representation of data that can be opened, rendered and/or edited by such document management software application. Accordingly, the document may be formatted and structured in a particular way so that its elements can be rendered consistently. In the exemplary embodiment discussed herein, the document management software application handles PDF documents, and the following description will be in reference thereto. Documents in any other format that are editable or viewable with any other software application may be substituted.

Figure 3:
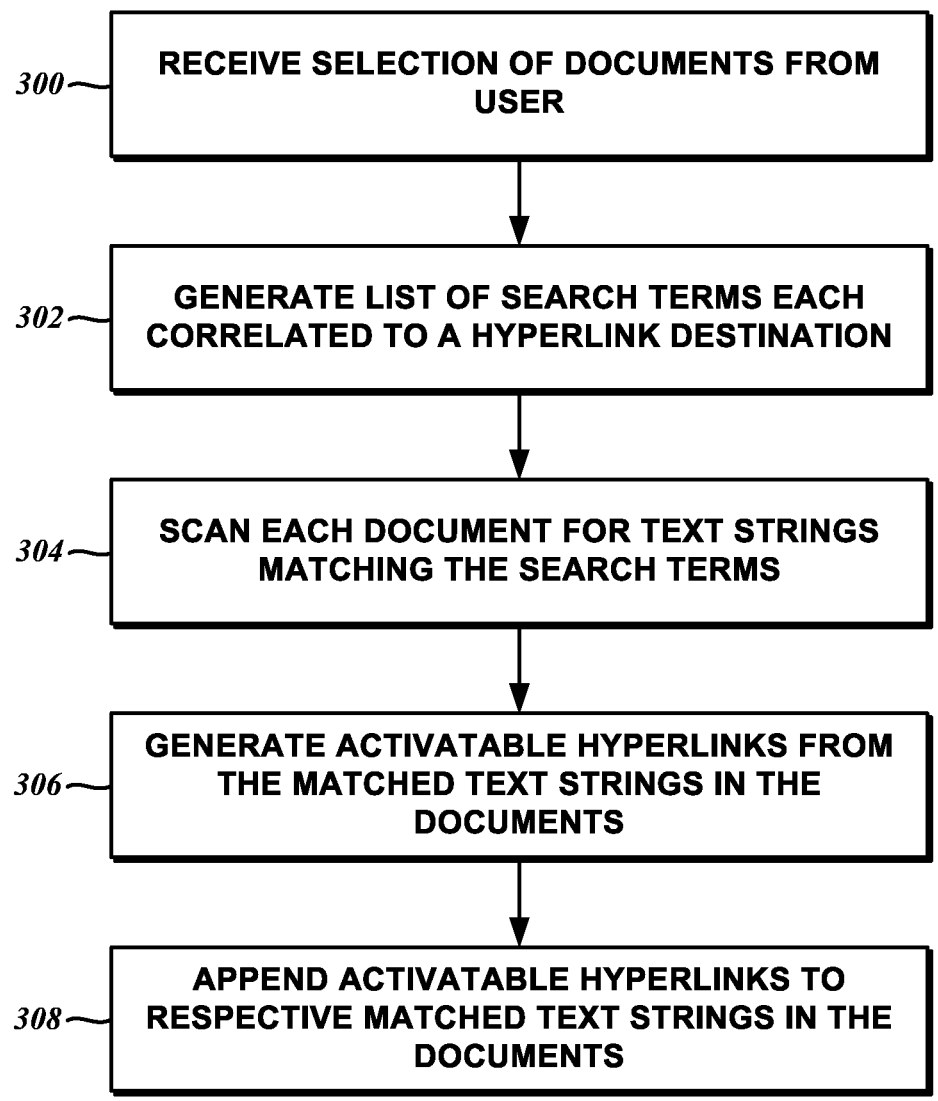
FIG. 3 is a flowchart illustrating one embodiment of a method for automatically batch hyperlinking a plurality of electronic documents in accordance with the present disclosure.
Figure 4:
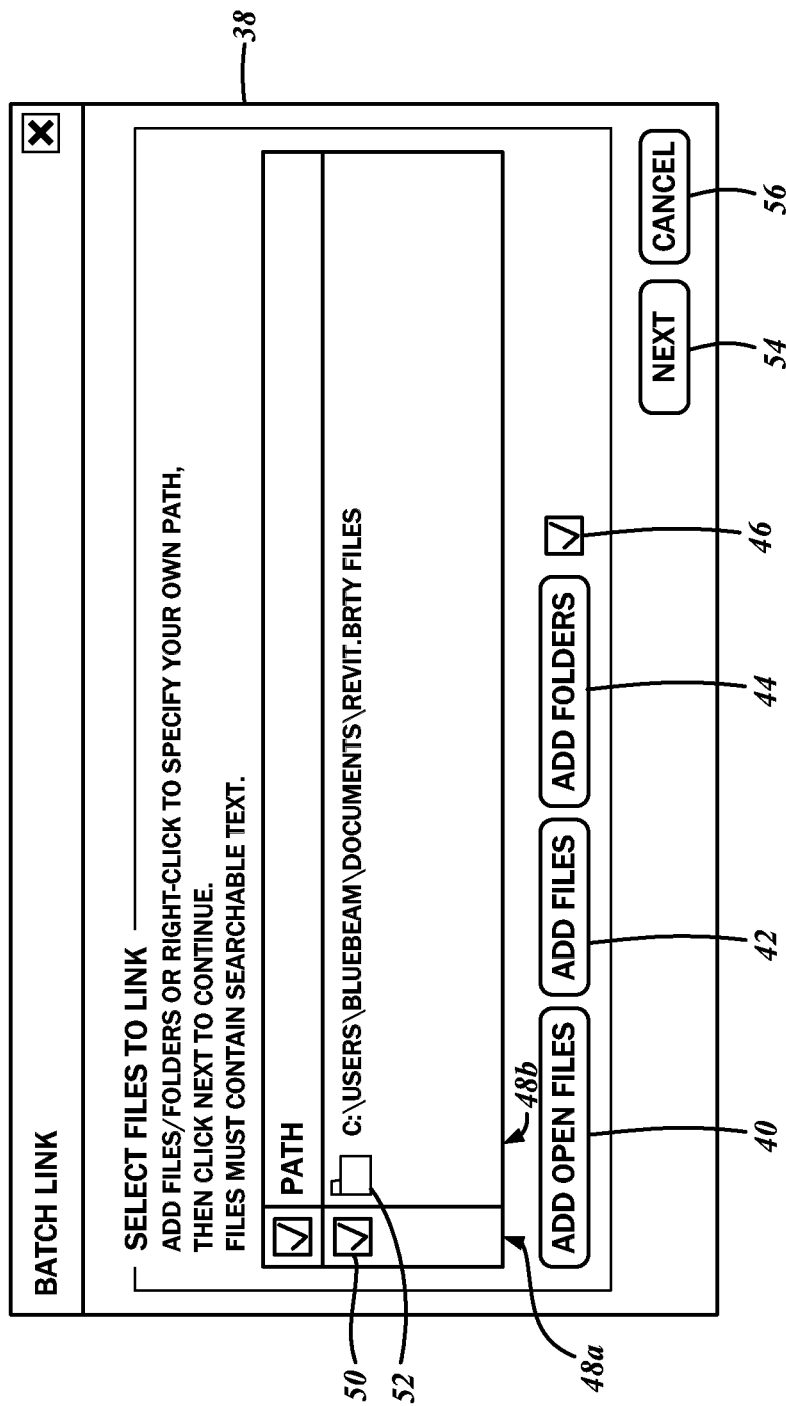
FIG. 4 is a file selection dialog window generated by a document management software application for receiving certain parameters for executing the method for automatically batch hyperlinking documents.

In general, the method may be segregated into discrete workflow stages of selecting files, generating search terms, managing links, running the batch process, and reviewing the results. As best shown in the flowchart of FIG. 3, the method may commence with a step 300 of receiving a selection of a plurality of electronic documents from the user. In order to obtain this selection, with reference to FIG. 4, a file selection dialog window 38 is presented to the user. This is understood to be a part of the user interface of the aforementioned document management software application, and may be invoked by a particular menu option therefor and various other user elements thereof. The layout and appearance of the file selection dialog window 38, as with the other dialog windows and graphical user interface components described in greater detail below, are presented by way of example only and not of limitation. As such, any suitable layout or appearance may be readily substituted without departing from the scope of the present disclosure.

The file selection dialog window 38 is understood to receive the aforementioned selection of the plurality of electronic documents. In this regard, the files of the documents to be searched in accordance with the subsequent steps of the method may be specified in various ways. One possible way is to add the files or documents that are currently opened within the document management software application by activating an add open files button 40. Another possible way is to specify a particular file or files from within a single folder or directory that is part of the hierarchical file system by activating an add files button 42. Yet another different way is to specify a folder or directory containing the files to be searched by activating an add folders button 44. In the latter two ways, a conventional file system interface dialog window is generated to accept input of specifying the file or folder. The files contained within subfolders of the selected folder may also be recursively specified, and when this is desired an add subfolders checkbox 46 may be activated.

When a file or folder is added, it is listed in a selection listing 48, which may have a first column 48*a* and a second column 48*b*. The first column 48*a* includes a checkbox 50 which can be activated or deactivated to include the file or folder path corresponding thereto in subsequent steps of the workflow while still being shown in the selection listing 48. As will be described in further detail below, the specified search location, which is understood to generally encompass the specified file or the specified folder, may be checked on or checked off; when it is checked on, this means that the corresponding search locations will be searched, and any hyperlinks added over the results. When unchecked, those search locations will not be searched, and new hyperlinks will not be added to those documents. The second column 48*b* shows the specific file path or file name that has been added in accordance with the foregoing. Furthermore, an icon 52 in the same second column 48*b* indicates whether the particular selection is a folder or a file, or that it is an invalid path.

Rather than adding files or folders via the buttons 40, 42, or 44, it is also possible to right click within the selection listing 48 to add a new, blank search location. Along these lines, the listings themselves can be modified in accordance with standard graphical user interface text input modalities. Upon adding a new entry in the selection listing 48 or editing an existing one, various embodiments contemplate resolving the type of search location that was entered, e.g., whether it is a file or a folder, and whether the selection is valid or not. Removing entries from the selection listing 48 is also possible, by highlighting the particular entries and/or right-clicking the same to invoke a context-sensitive menu that includes a remove option. Deletion commands entered via the keyboard can invoke the same function.

As an alternative to the aforementioned selecting of files or folders, it is also possible to designate a set of related documents that are linked as such within the document management software application. One possible implementation of such functionality is disclosed in applicant's co-pending U.S. patent application Ser. No. 13/756,162 entitled "A METHOD FOR MANAGING AND SELECTIVELY ARRANGING SETS OF MULTIPLE DOCUMENTS AND PAGES WITHIN DOCUMENTS" and filed Jan. 31, 2013, the entirety of the disclosure of which is hereby incorporated by reference.

Following the selection of the plurality of electronic documents, the method proceeds to a step 302 of generating a list of search terms, each of which are correlated to a hyperlink destination that is one of the files in the selections made previously. This step may be invoked by activating a first next button 54*a*. If the user desires to cancel and stop the workflow, a cancel button 56 may be activated instead.

Generally, the step 302 is understood to involve the automatic discovery of named content in the previously specified search locations (the selection of which has further been activated via the corresponding checkbox 50).

Figure 5:
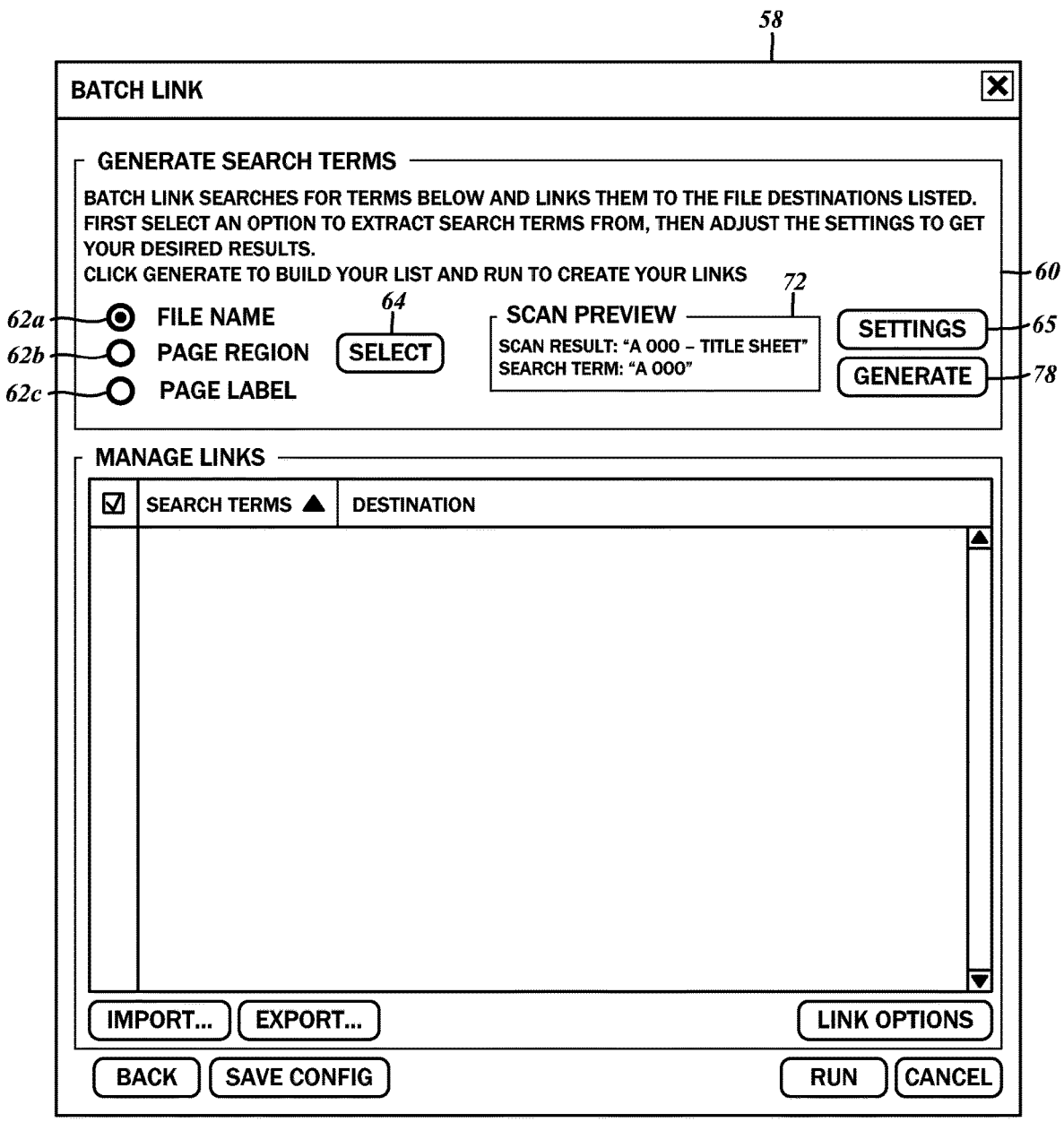
FIG. 5 is a search term definition dialog window generated by the document management software application.

The search terms are extracted from one of several sources. FIG. 5 illustrates an exemplary search term definition dialog window 58, through which the particular source of the search terms can be designated. The search term definition dialog window 58 has a source designation subsection 60 that includes a first radio button 62a for specifying the file name as the search term, a second radio button 62b for specifying a particular region within a page of the documents, and a third radio button 62c for specifying a label of a page of the documents.

If the first radio button 62a is selected, then the search terms are generated from at least a portion of the file names of the selected plurality of documents. Thus, the file name will be used as the content names, and pair each filtered search term with a destination to the associated file.

If the second radio button 62b is selected, then the desired region within the document is designated upon activating a select button 64. This invokes a process related to that which is set forth in more detail in applicant's related, co-pending application entitled "GENERATING UNIQUE DOCUMENT PAGE IDENTIFIERS FROM CONTENT WITHIN A SELECTED REGION" and filed on Feb. 3, 2014 with application Ser. No. 14/171,300, the entirety of the disclosure of which is hereby incorporated by reference. If there is an existing document that is open within the document management software application, then that document will be used as a basis for receiving a designation of a page region. On the other hand, if no document is opened, then one of the documents selected in previous step 300 will be opened. After receiving the input of the desired page region on the opened document, the document management software application returns to the search term definition dialog window 58. The underlying content of the selected region in each page in the selected plurality of documents will be used as content names and pair each search term with a destination to the associated page in each file.

If the third radio button 62c is selected, then the search terms are generated from the page labels of each page in the selected plurality of documents will be used as the content names. Thus, each filtered search term will be paired with a destination to the associated page in each file.

Figure 6:
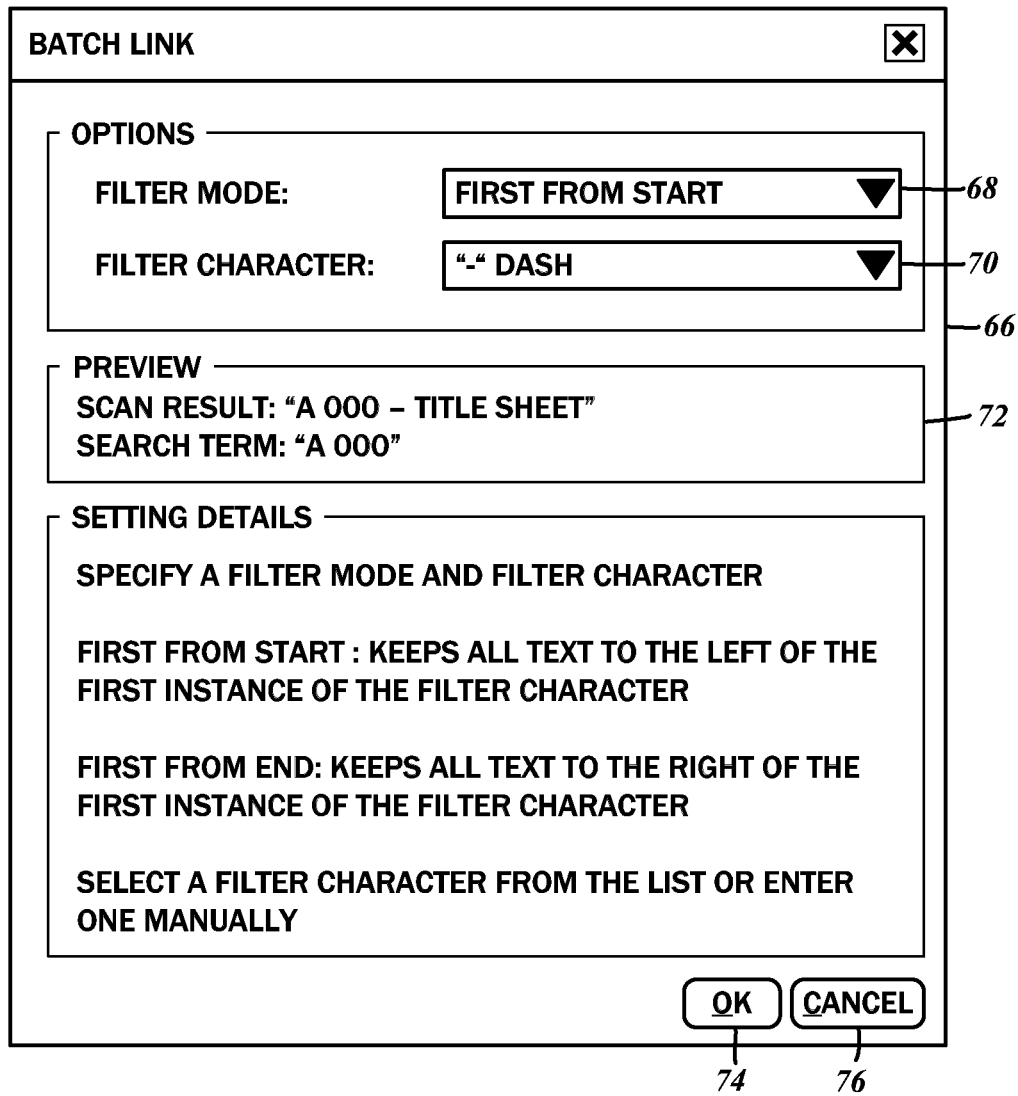
FIG. 6 is a search term setting dialog window generated by the document management software application.

Additional settings pertaining to the source designation may be defined from a separate search term setting widow 66 as shown in FIG. 6 and invoked by activating a settings button 65. These settings, in particular, include filtering rules that exclude extraneous information that may be found in each name. There is a first drop-down menu 68 that allows the selection of one of two filter modes, or no filtering at all. There is a first from start filter mode and a first from end filter mode. A filter character may be designated through a second drop-down menu 70, though in various implementations it is possible to input one manually. Common ones that are incorporated into the second drop-down menu 70 include the dash character, the underscore character, the space character, and the period character. The first from start filter mode retains all text to the left of the first instance of the filter character, while the first from end filter retains all text to the right of the last instance of the filter character. As a general matter, excluded from the search terms are file extensions.

A sample result of the selected filtering options can be generated within a preview subsection 72 of the search term setting window. The preview is based upon the first name found from the selection of the documents. As shown in the example, if the first from start filter mode is selected, and the filter character is the dash "-" character, then when the file name is "A 000—TITLE SHEET," only the "A 000" portion is retained. That is, the sequential characters of "A 000," up to the filter/delimiter character, "-", is the search term. The search term definition dialog window 58 likewise includes the preview subsection 72 with the same content. If the filter settings are acceptable, then an OK button 74 may be activated to commit the settings and return to the search term definition dialog window 60. Otherwise, a cancel button 76 can be activated to discard any of the modifications made to the filtering options.

Returning to FIG. 5, a generate button 78 can be activated to invoke the next step of the method, that is, scanning through each checked search location, extract each content name in the manner designated by the selection of the radio buttons 62, filter each name by the specified filtering options, and subsequently create a search action that pairs a string of search terms with a hyperlink destination represented in a human-readable string. In this regard, as shown in the flowchart of FIG. 3, the method continues with a step 304 of scanning each document for text strings matching the search terms in the aforementioned list.

Figure 7:
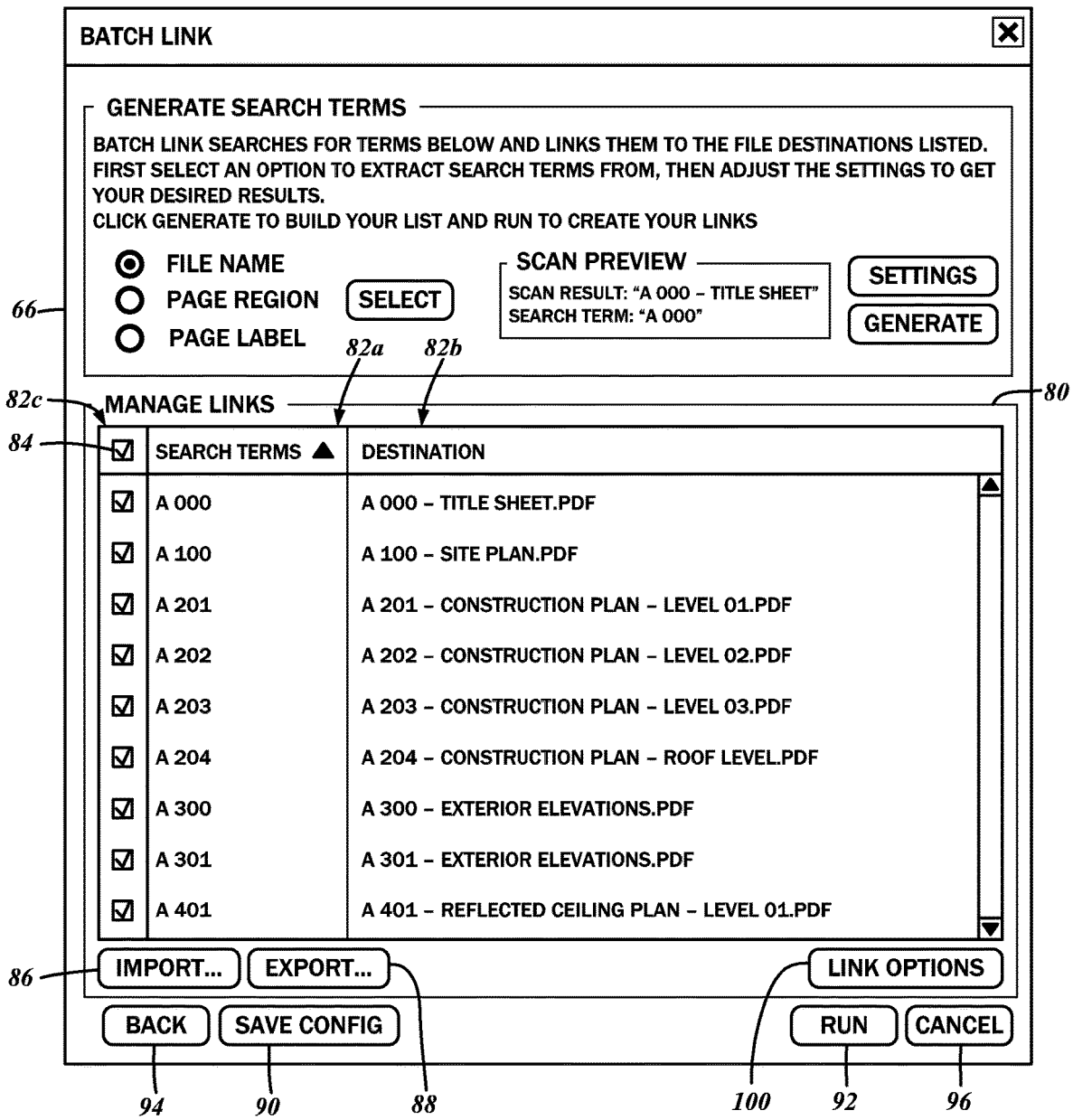
FIG. 7 is the search term definition dialog window with the list of search terms populated.

As best shown in an updated search term setting window 66 of FIG. 7, a link management subsection 80 thereof is populated with data resulting from the previous step. There is a first column 82a that is a listing of the search terms generated in accordance with step 302, and a second column 82b with its corresponding hyperlink destination, i.e., the file, page region, or location as designated by its page label that is to be opened upon activation. In addition, this may be specified in terms of a Uniform Resource Locator (URL). Thus, a given row in the link management subsection is understood to correspond to a particular search action.

The syntax of specifying the destination may depend on the particular implementation of the document management software application. In one exemplary embodiment, specifying a file may be without any additional delimiter. Furthermore specifying a particular page in a file may take the form of "page [#] in [filename]" where the actual data is substituted for the entirety of the string including the surrounding brackets. Specifying a particular place/location in a file may take the form of "place [place name] in [filename]" with similar substitutions. Specifying a URL may take the form of "web [URL]".

Again, the search terms were generated from one of various parts of the files that were designated to be part of the batch linking process, and the process further contemplates linking to the various destinations as set forth in the second column 82b whenever a document contains a text string of the search term corresponding to its destination. There is also a third column 82c in which particular search terms/destinations can be activated or deactivated via the checkboxes for purposes of the workflow contemplated herein.

Standard modalities for interacting with the link management subsection 80 are possible. For instance, a right click can be entered thereon to insert a new search action. Furthermore, each entry of the search term and destination, e.g., the search action, can be edited by the user. The document management software application can implement additional duplicate checking functionality and other validation steps that ensure the destination file exists. To the extent multiple file names stored across different hierarchical levels/folders, a particular one in a particular location can be designated also by a right click and a selection. Multiple entries/search actions can be selected at once for deletion. Those having ordinary skill in the art will recognize other potential interactions with the link management subsection 80 that are expected behaviors standard across all other similar user interface elements.

Referring again to the search term setting window 66 of FIG. 7, several other interface elements are contemplated to provide additional peripheral functionality in the document management software application. One such additional functionality that may make use of the presently contemplated features is to load an existing set of data into the link management subsection 80, that is, the search actions as defined by the search term and destination. This function may be invoked by activating an import button 86. Conversely, the search actions as currently defined may be saved for subsequent re-use by activating an export button 88. Such data may be stored as a comma separated value (.CSV) file, which can be edited in a conventional spreadsheet software application, or shared with other users. The entirety of the configuration as set and defined within the search term setting window 66 and related peripheral dialogs accessed therefrom, including the search location, search action, and link option (described more fully below), can be saved for subsequent retrieval by activating a save configuration button 90. Preferably, though optionally, the data may be saved as an XML file.

As shown in the flowchart of FIG. 3, the method continues with a step 306 of generating, without user intervention, activatable hyperlinks from the matched text strings in the plurality of electronic documents. The activatable hyperlinks area assigned the hyperlink destinations to which the corresponding search terms of the matched text strings are correlated in the list. This step is understood to involve searching for the search terms in each of the documents that was specified earlier, and creating links to the destination corresponding to those search terms. Taking the example shown in the preview subsection 72, each of the specified documents are searched for the term "A 000", and when one is found, a hyperlink to the corresponding PDF document, "A 000—TITLE SHEET.PDF" is created therefor. This may be invoked by activating a run button 90. On the other hand, if it is desired to return to the file selection dialog window 38 shown in FIG. 4, this may be possible by activating a back button 94. The contemplated workflow may be entirely cancelled by activating a cancel button 96.

Figure 8:
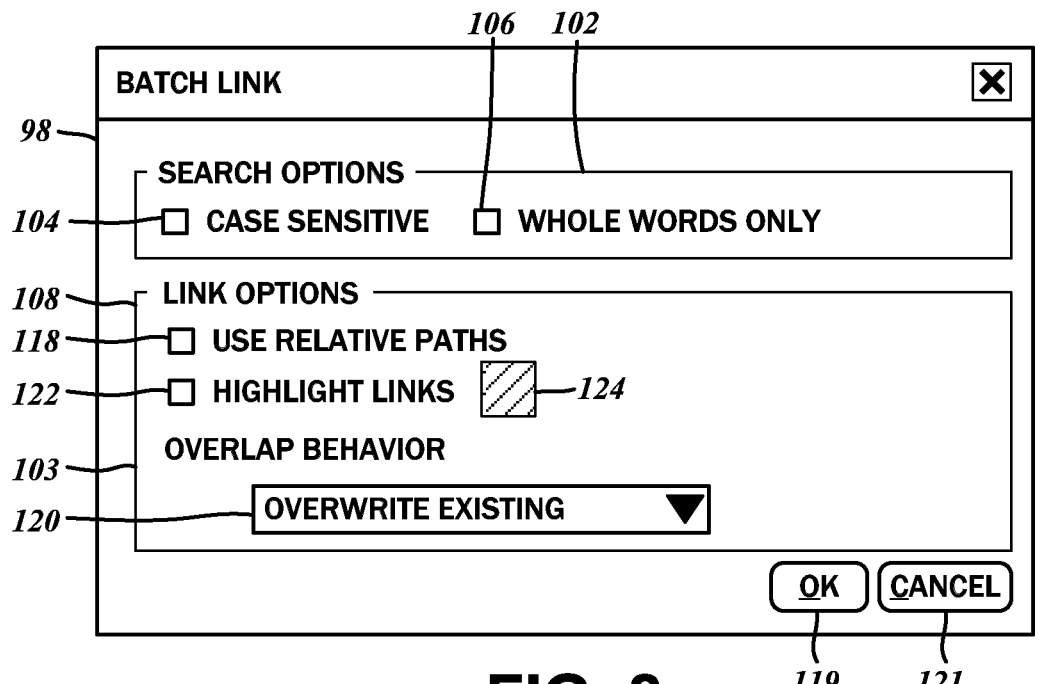
FIG. 8 is a link option dialog window generated by the document management software application.

Prior to generating the activatable hyperlinks in accordance with the step 306, it is possible to set additional options. FIG. 8 is of an exemplary link option dialog window 98 that can be invoked by activating a link options button 100 in the search term setting window 66. There are two parameters of the searching operation that can be defined in a first subsection 102 with a checkbox 104 for making the search case-sensitive, and a checkbox 106 for matching of whole words only, that is, the entirety of string as defined in the search terms. In a second subsection 103, there is a checkbox 118 for selecting the use of relative paths rather than full paths. This may be useful in situations where entire sets of documents are shared amongst multiple collaborators, and where the use of absolute paths may result in referential integrity errors. Once these and other options are set (as more fully detailed below), an OK button 119 may be activated to commit the settings, or alternatively, a cancel button 121 may be activated to revert to the previously set configuration.

With reference again to the flowchart of FIG. 3, the method continues with a step 308 of appending the activatable hyperlinks to the respective matched text strings in each of the plurality of electronic documents. When implemented in the document management software application, the aforementioned step 306 of generating activatable hyperlinks is executed without user intervention, as is the step 308.

In further detail, the method involves iterating over each page in each document, and searches for the each of the search terms in parallel. Once all of the searches are completed for all of the pages in a given document, the results of such search are processed and a series of additional steps is performed.

The first of these steps is the removal of any existing hyperlinks and highlight annotations that were created in a previous iteration of the above-described process. Each hyperlink or highlight annotation created is tagged with the particular search terms that were used to place the same. Thus, if any existing hyperlink or highlight annotation in the current document is tagged with any of the search terms that are common with one being currently utilized, the hyperlink or highlight annotation is removed from the document.

The second of the steps is the removal or maintenance of any hyperlinks that overlap with any of the search results. What exact behavior is exhibited may be selected via a pull-down menu 120 that defines the overlap behavior. One of the possible options involves overwriting existing hyperlinks. In such case, any user-created hyperlink that intersects with the hyperlinks automatically placed in accordance with the method of the present disclosure will be removed. Another possible option involves maintain existing hyperlinks. In such case, any user-created hyperlink that intersects with the automatically placed hyperlinks will be maintained.

The third of the steps is adding highlight annotations over the bounds of each search result, and tagging the same with the corresponding search terms. This feature may be activated or deactivated via a checkbox 122 in the second subsection 108 of the link option dialog window 98 as shown in FIG. 8. Additionally, it may be possible to define the desired highlight color through a swatch interface 124.

Finally, the hyperlinks are added over the bounds of each search result, and the click action to the destination associated therewith is set. Additionally, the hyperlinks are also tagged with the appropriate search terms.

Figure 9:
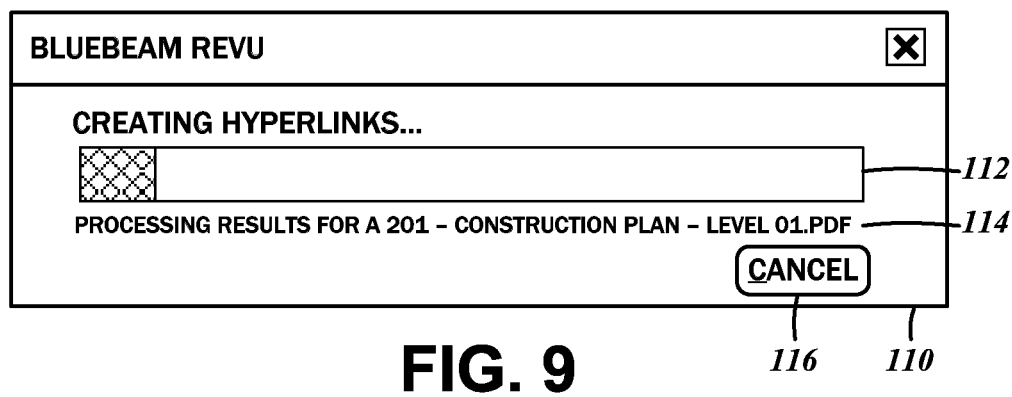
FIG. 9 is a progress window generated by the document management software application while various steps of the method not requiring user intervention are being executed.
Figure 10:
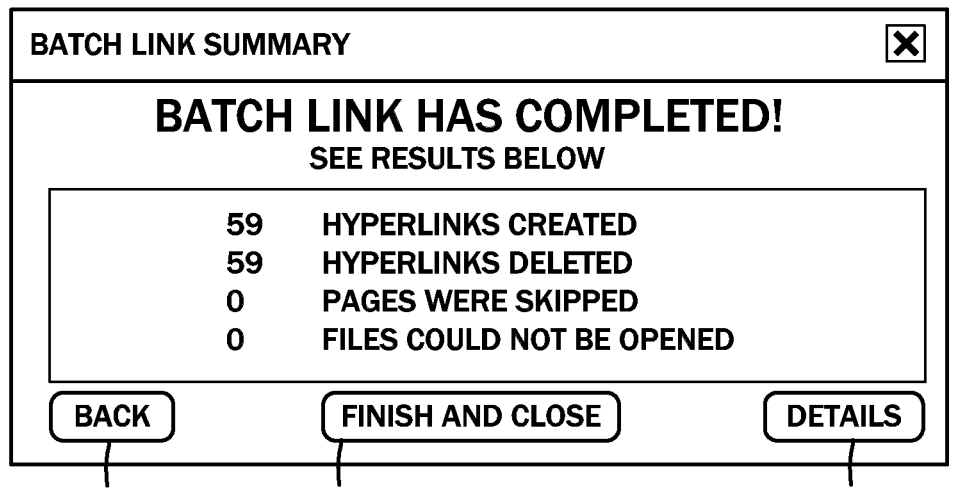
FIG. 10 is a completion announcement window generated by the document management software application.

As shown in FIG. 9, the progress of these operations may be tracked in a progress window 110 that includes a progress bar 112 and a detail indicator 114 that shows which particular file is currently being processed in accordance with the present method. Once complete, a completion announcement window 126 is displayed, along with various details of the actions that were taken. These details include the number of hyperlinks created, the number of hyperlinks deleted, the number of hyperlinks that were skipped, and the number of files that could not be opened. The user has several further options to proceed once the workflow has reached this point. Activating a back button 128 returns the workflow to the search term setting window 66, while a finish and close button 130 closes all dialog windows and returns to the primary interface of the document management software application.

Figure 11:
FIG. 11 is a processing log window generated by the document management software application which details the various operations that were performed.

Activating a details button 132 shows additional processing details for each of the files, as shown in a processing log window 134 in FIG. 11. A summary of the total processing time is shown, along with the number of outbound, inbound, maintained, and deleted hyperlink per page in the designated documents. Furthermore, if any page containing no searchable text was encountered, any documents were unable to be opened, if any search locations were invalid, or if any search actions had invalid destinations, those would also be indicated.

The particulars shown herein are by way of example and for purposes of illustrative discussion of the embodiments of the present disclosure only and are presented in the cause of providing what is believed to be the most useful and readily understood description of the principles and conceptual aspects of the disclosure. In this regard, no attempt is made to show more details than is necessary for a fundamental understanding of the disclosure, the description taken with the drawings making apparent to those skilled in the art how the several forms of the presently disclosed methods may be embodied in practice.

What is claimed is:

1. A method for automatically hyperlinking a plurality of electronic documents each including one or more pages, the electronic documents being stored on a computer and organized according to a hierarchical file system, the method comprising:
   receiving from a user a selection of the plurality of electronic documents;
   generating a list of search terms from the received selection of the plurality of electronic documents, each of the search terms of the list being correlated with a single hyperlink destination of one of the selected ones of the plurality of electronic documents, each of the search terms being extracted from a user-designated source common to all of the plurality of electronic documents, wherein the user-designated source is selected from a file name and a page region;
   scanning, without user intervention, each of the selected ones of the plurality of electronic documents for text strings matching the search terms in the list;
   generating, without user intervention, activatable hyperlinks from the matched text strings in the plurality of electronic documents, the activatable hyperlinks being assigned the hyperlink destinations to which the corresponding search terms of the matched text strings are correlated;
   determining whether at least one activatable hyperlink already exists in the plurality of electronic documents;
   upon determining that at least one activatable hyperlink already exists in the plurality of electronic documents, removing the existing at least one activatable hyperlink from the plurality of electronic documents, the existing at least one activatable hyperlink having been previously appended to a respective matched text string; and
   appending, without user intervention, the generated activatable hyperlinks to the respective matched text strings in each of the plurality of electronic documents.

2. The method of claim 1, wherein the plurality of documents includes those documents which are stored in 1) a directory of the hierarchical file system of the computer, the selection being designated upon activation by the user of a first interface element corresponding to the directory generated on an application graphical user interface, or 2) a subdirectory nested in the directory, the selection being designated upon activation by the user of a second interface element representative of a subdirectory traversal option generated on an application graphical user interface.

3. The method of claim 1, wherein if the user-designated source is the file name:
   the search terms are generated from at least a portion of file names of the selected plurality of electronic documents that include the hyperlink destinations to which the respective search terms are correlated; and
   the hyperlink destinations are specified as one of file names of the electronic documents, pages of the electronic documents, locations within the electronic documents, and uniform resource locators.

4. The method of claim 3, wherein the search terms include an entirety of the file names except for file extensions.

5. The method of claim 3, wherein the search terms include sequential characters of the file names up to a filter character.

6. The method of claim 3, wherein the search terms include sequential characters of the file names following a filter character.

7. The method of claim 1, wherein if the user-designated source is the page region:
   the search terms are generated from page content retrieved from a selected region of each page of the selected plurality of electronic documents that include the hyperlink destinations to which the respective search terms are correlated; and
   the hyperlink destinations are specified as at least one of file names of the electronic documents, pages of the electronic documents, locations within the electronic documents, and uniform resource locators.

8. The method of claim 7, wherein the search terms include an entirety of the page content within the selected region.

9. The method of claim 1, wherein the user-designated source is further selected from a page label and, if the user-designated source is the page label:
   the search terms are generated from page labels that are assigned to each page of the selected plurality of electronic documents that includes the hyperlink destinations to which the respective search terms are correlated; and
   the hyperlink destinations are specified as at least one of file names of the electronic documents, pages of the electronic documents, locations within the electronic documents, and uniform resource locators.

10. The method of claim 9, wherein the search terms include an entirety of the page labels.

11. The method of claim 9, wherein the search terms include sequential characters of the page labels up to a filter character.

12. The method of claim 9, wherein the search terms include sequential characters of the page labels following a filter character.

13. The method of claim 1, wherein prior to generating the list of search terms, displaying a preview of a first one of the search terms correlated to a first one of the plurality of electronic documents on an application graphical user interface.

14. The method of claim 1, further comprising:
   generating annotations for each of the activatable hyperlinks; and
   appending the annotations to the respective matched text strings in the plurality of electronic documents.

15. The method of claim 14, wherein the annotations are highlight objects overlaid on the matched text strings.

16. The method of claim 14, further comprising:
   tagging each of the annotations with the respective matched text strings to which they are appended as metadata.

17. A non-transitory computer readable medium storing instructions that, when executed by one or more processors, cause the one or more processors to perform a method of automatically hyperlinking a plurality of electronic documents each including one or more pages, the electronic documents being stored on a computer and organized according to a hierarchical file system, the method comprising:

receiving from a user a selection of the plurality of electronic documents;

generating a list of search terms from the received selection of the plurality of electronic documents, each of the search terms of the list being correlated with a single hyperlink destination of one of the selected ones of the plurality of electronic documents, each of the search terms being extracted from a user-designated source common to all of the plurality of electronic documents, wherein the user-designated source is selected from a file name and a page region;

scanning each of the selected ones of the plurality of electronic documents for text strings matching the search terms in list;

generating, without user intervention, activatable hyperlinks from the matched text strings in the plurality of electronic documents, the activatable hyperlinks being assigned the hyperlink destinations to which the corresponding search terms of the matched text strings are correlated;

determining whether at least one activatable hyperlink already exists in the plurality of electronic documents;

upon determining that at least one activatable hyperlink already exists in the plurality of electronic documents, removing the existing at least one activatable hyperlink from the plurality of electronic documents, the existing at least one activatable hyperlink having been previously appended to a respective matched text string; and appending the generated activatable hyperlinks to the respective matched text strings in each of the plurality of electronic documents.

18. A system for automatically hyperlinking a plurality of electronic documents each including one or more pages, the electronic documents being stored on a computer and organized according to a hierarchical file system, comprising:

one or more processors; and at least one non-transitory computer readable medium storing instructions that, when executed by the one or more processors, cause the one or more processors to perform a method comprising:

receiving from a user a selection of the plurality of electronic documents;

generating a list of search terms from the received selection of the plurality of electronic documents, each of the search terms of the list being correlated with a single hyperlink destination of one of the selected ones of the plurality of electronic documents, each of the search terms being extracted from a user-designated source common to all of the plurality of electronic documents, wherein the user-designated source is selected from a file name and a page region;

scanning each of the selected ones of the plurality of electronic documents for text strings matching the search terms in list;

generating, without user intervention, activatable hyperlinks from the matched text strings in the plurality of electronic documents, the activatable hyperlinks being assigned the hyperlink destinations to which the corresponding search terms of the matched text strings are correlated;

determining whether at least one activatable hyperlink already exists in the plurality of electronic payments;

upon determining that at least one activatable hyperlink already exists in the plurality of electronic documents, removing the existing at least one activatable hyperlink from the plurality of electronic documents, the existing at least one activatable hyperlink having been previously appended to a respective matched text string; and appending the generated activatable hyperlinks to the respective matched text strings in each of the plurality of electronic documents.

* * * * *